United States Patent
Thumm et al.

(10) Patent No.: US 11,108,309 B2
(45) Date of Patent: Aug. 31, 2021

(54) SQUIRREL CAGE ROTOR

(71) Applicant: WIELAND-WERKE AG, Ulm (DE)

(72) Inventors: Gerhard Thumm, Erbach (DE);
Volker Voggeser, Senden (DE);
Michael Wolf, Ulm (DE); Christoph Kästle, Ulm (DE); Michael Lieble, Vöhringen (DE)

(73) Assignee: WIELAND-WERKE AG, Ulm (DE)

( * ) Notice: Subject to any disclaimer, the term of this patent is extended or adjusted under 35 U.S.C. 154(b) by 62 days.

(21) Appl. No.: 16/655,561

(22) Filed: Oct. 17, 2019

(65) Prior Publication Data
US 2020/0127542 A1    Apr. 23, 2020

(30) Foreign Application Priority Data

Oct. 23, 2018    (DE) ............... 10 2018 008 347.1

(51) Int. Cl.
*H02K 15/10* (2006.01)
*H02K 3/32* (2006.01)
*H02K 15/03* (2006.01)
*H02K 17/16* (2006.01)

(52) U.S. Cl.
CPC ............ *H02K 15/10* (2013.01); *H02K 3/32* (2013.01); *H02K 15/03* (2013.01); *H02K 17/165* (2013.01)

(58) Field of Classification Search
CPC ...... H02K 15/0012; H02K 3/32; H02K 3/345; H02K 15/10; H02K 15/03; H02K 17/165; H02K 7/00
See application file for complete search history.

(56) References Cited

U.S. PATENT DOCUMENTS

| 4,447,947 A * | 5/1984 | McCarty | H02K 3/24 174/15.6 |
| 2013/0187512 A1* | 7/2013 | Buttner | H02K 15/0012 310/211 |
| 2014/0285058 A1* | 9/2014 | Thumm | H02K 15/0012 310/211 |

(Continued)

FOREIGN PATENT DOCUMENTS

| DE | 941078 | 4/1956 |
| DE | 1018980 | 11/1957 |

(Continued)

OTHER PUBLICATIONS

Office Action of German Patent Office issued in corresponding German Application No. 10 2018 008 347.1 dated Sep. 2, 2019 (5 pages).

(Continued)

*Primary Examiner* — Peter Dungba Vo
*Assistant Examiner* — Jose K Abraham
(74) *Attorney, Agent, or Firm* — Flynn Thiel, P.C

(57) ABSTRACT

A squirrel cage rotor, is made up of a shaft, a rotor laminated core with rotor bars which are arranged in the interior, and short-circuiting rings with clearances through which the bar ends of the rotor bars extend out of the rotor laminated core. The rotor bars, on their surface, at least partially have an electrical insulation layer, wherein the electrical insulation layer is cohesively connected only to the surface of the rotor bars. The squirrel cage rotor is intended, in particular, for use in an asynchronous machine.

13 Claims, 2 Drawing Sheets

(56) References Cited

U.S. PATENT DOCUMENTS

| | | | |
|---|---|---|---|
| 2015/0155766 A1* | 6/2015 | Cooper | H02K 3/24 174/15.6 |
| 2015/0162811 A1 | 6/2015 | Lee et al. | |
| 2017/0141661 A1 | 5/2017 | Fischer et al. | |
| 2018/0342935 A1 | 11/2018 | Thumm et al. | |

FOREIGN PATENT DOCUMENTS

| | | | | |
|---|---|---|---|---|
| DE | 3421537 A1 | 12/1985 | | |
| DE | 10247484 A1 * | 4/2004 | | H02K 17/165 |
| DE | 10247484 A1 | 4/2004 | | |
| DE | 102005030797 A1 | 1/2007 | | |
| DE | 102014117265 A1 | 6/2015 | | |
| DE | 102014013684 A1 | 3/2016 | | |
| EP | 2782222 A2 | 9/2014 | | |
| EP | 2852034 A1 * | 3/2015 | | H02K 15/0012 |
| EP | 3145059 A1 | 3/2017 | | |
| EP | 3168969 A1 | 5/2017 | | |
| JP | 89606 A | 1/1996 | | |

OTHER PUBLICATIONS

Office Action of European Patent Office issued in corresponding European Patent Application No. 19 000 444.0 dated Feb. 16, 2021 (4 pages).

* cited by examiner

SQUIRREL CAGE ROTOR

CROSS-REFERENCE TO RELATED APPLICATIONS

This claims priority from German Application No. 10 2018 008 347.1, filed Oct. 23, 2018, the disclosure of which is hereby incorporated by reference in its entirety into this application.

FIELD OF THE INVENTION

The claimed invention relates to a squirrel cage rotor.

In known squirrel-cage rotors, a rotor laminated core which is provided with closed slots contains rotor bars composed of an electrically highly conductive material which are embedded in the slots, the bar ends of said rotor bars projecting beyond the end sides of the rotor laminated core and being hard-soldered or welded to compact short-circuiting rings. For the purpose of preventing delamination of the rotor laminated core and disturbing oscillations, separate, compact pressure rings are press-fitted onto the end side of the rotor laminated core as required. In order to further prevent axial displacement of the rotor bars in the slots of the rotor laminated core, said rotor bars are mechanically fixedly connected to the rotor laminated core.

BACKGROUND OF THE INVENTION

A squirrel cage rotor with a cage winding is known from document DE 34 21 537 A1. The cage winding comprises electrically conductive rotor bars which are arranged in closed slots of a rotor laminated core and protrude beyond the end sides of said rotor laminated core. The projecting ends are electrically connected to highly conductive short-circuiting rings. The short-circuiting rings, corresponding to the rotor laminations, are configured as slotted laminated cores composed of a highly electrically conductive material and, as end-side pressure bodies, are fixedly connected to the rotor bars over the entire surface area in their closed slots, in close proximity to the rotor laminated core, in a heat-transmitting manner. A particular feature is that the individual electrically conductive laminations for the short-circuiting rings have a greater thickness than the rotor laminations, but otherwise have the same size and shape. During the production of a squirrel cage rotor, the short-circuiting rings and the rotor laminations are stacked together, fitted with the rotor bars which are inserted on the end side and thereafter, with axial pressing of the entire stack, the bar ends of the rotor bars are hard-soldered to the short-circuiting rings.

In the case of cage rotors of asynchronous machines, different forms of the cage bars have been developed for an extremely wide variety of applications over time, which forms have selected properties and are then particularly suitable for the respective applications.

Further developments in respect of the arrangement of the rotor bars in the rotor laminated core can be found in documents EP 3 145 059 A1 and EP 3 168 969 A1. Both documents describe cage rotors of asynchronous machines with radially closed or partially open slot cutouts with conductor bars which are arranged in the slot cutouts and which are fixed by a metal epoxy adhesive or alternatively using a foam material.

All cutouts have the same cross section as viewed in the circumferential direction of a lamination. Here, the conductor bars which are to be axially inserted into the slot cutouts are provided with a sufficient amount of radial play. Both the geometric configurations and also the dimensions of the slot cutout influence the magnetic behavior of the cage rotor and therefore ultimately the desired operating behavior of the asynchronous machine.

Consequently, the conductor bars which do not form a press-fit with the slot cutout are axially inserted into the slot cutouts of the laminations or of the laminated core. The conductor bars can already be connected to a short-circuiting ring and then form a half-cage. The space which now remains within the slot cutout between the laminated core and the bar composed of aluminum or copper can be filled with foam material or by epoxy resin which can also be admixed with ferromagnetic particles of small particle size. Here, the non-reactive resistance of the epoxy adhesive is higher than that of electrical laminations, which means insulation of the bar in the slot and therefore causes smaller power losses in comparison to the conventional design with molded-in bars.

In general, it is known that stack transverse flows occur in the rotor laminated core in slanted squirrel cage rotors, which stack transverse flows have a negative influence on the degree of efficiency of the asynchronous machine. Stack transverse flows occur significantly preferably in asynchronous machines of slanted construction, the slot distribution of the stator in said asynchronous machines not being equal to the rotor slot distribution.

The invention is based on the object of developing a cage rotor in respect of the rotor bars.

The claimed invention is described with respect to a squirrel cage rotor and to advantageous embodiments and developments of the invention.

The invention includes a squirrel cage rotor, comprising a shaft, a rotor laminated core with rotor bars which are arranged in the interior, and short-circuiting rings with clearances through which the bar ends of the rotor bars extend out of the rotor laminated core. The rotor bars, on their surface, at least partially have an electrical insulation layer, wherein the electrical insulation layer is cohesively connected only to the surface of the rotor bars. The squirrel cage rotor is intended, in particular, for use in an asynchronous machine. Said squirrel cage rotor may be, in particular, a copper rotor with slanted barring and a squirrel cage rotor cage.

In this case, the invention is based on the consideration that the rotor laminated core with the shaft and the short-circuiting rings produces a compact squirrel cage rotor component after the joining process. Rotor bars which are electrically conductively connected to the material of the short-circuiting rings are guided through the rotor laminated core and the short-circuiting rings. To this end, the rotor bars have an excess length with respect to the rotor laminated core, so that these bar ends protrude into clearances in the short-circuiting rings. The short-circuiting rings are positioned on the shaft on either side of the rotor laminated core.

A reduction in the electrical conductivity between adjacent rotor bars in the laminated core takes place with the objective of suppressing current flow between the rotor bars through the laminated core. This is achieved with the insulating materials above a comparatively high specific resistance. Furthermore, tests have shown that, in addition to the electrical and thermal characteristic values of the insulation layers, the hardness and adhesive strength of said insulation layers also has a considerable influence on suitability. Therefore, care should be taken in the case of partially applied insulation layers that they effectively prevent direct contact of the rotor bars with the rotor laminated core under all operating conditions.

One possible way of applying the insulating material to the surface of the component is coating by means of the immersion coating method. This can be subdivided into three phases. Said method begins with immersing the test body into the coating which is present in an aqueous state. The body remains there until its surface is completely wetted by the solution. The preparation is then pulled upward out of the solution at a constant rate. In the process, excess liquid runs off from the workpiece surface and a thin film remains on the workpiece. This method is already very highly suitable for applying an insulating material to the entire surface of a rotor bar.

Furthermore, fiber insulating materials which, after cleaning of the surface, are applied to said surface in a layered manner and are cohesively connected to the surface of the rotor bars are suitable for an electrical insulation layer. In order to ensure a maximum adhesive strength, care must be taken to avoid pockets of air.

It is advantageous to clean the workpiece before coating. In so doing, particles of dirt and other deposits are removed from the surface in order to achieve uniform and clean connection of the insulation layer on the rotor bar surface.

The particular advantage is that the degree of efficiency of an asynchronous machine can be significantly increased by insulating the rotor bars, in particular, of a slanted squirrel cage rotor. In addition, rotor thermal losses can be reduced by avoiding stack transverse currents in barred squirrel cage rotors, which are constructed from copper, for asynchronous machines for the purpose of further increasing the degree of efficiency.

Insulating materials which can be used for the purpose of preventing stack transverse currents in rotors of asynchronous machines have been found with selected prioritized properties within the scope of investigations. The insulating materials which come into consideration firstly satisfy the electrical properties and secondly withstand both thermal influences, for example due to welding, and also deformation for producing twisted rotor bars in possible series production. Some of the insulating materials which preferably come into consideration for the purpose of avoiding stack transverse currents can be ceramics, mica, polyimide, mixed plastic compounds and fiber mixtures.

In a particular refinement of the invention, at least one part of a short-circuiting ring can consist of a disk stack which is constructed in a layered manner from disks with clearances.

Each short-circuiting ring itself consists of a disk stack which is constructed from a plurality of individual disks with the same or a varying diameter. The disks have, on the disk surface, as many clearances as rotor bars are required for constructing a squirrel cage rotor. These individual components, which are initially loosely arranged in relation to one another, are connected to form a compact squirrel cage rotor.

In order to establish a joining connection, disks which are arranged adjacently can have a small gap as a slot, along which gap a joining connection can be established. A slot between the disks extends around the outer periphery of a disk stack and reaches radially approximately as far as the clearances for the rotor bars. A slot which can reach radially as far as the level of the rotor bars is formed in this way. In order to connect the individual disks in the disk stack to the rotor bar, a joining connection is established along this slot, which joining connection mechanically and also electrically connects the individual parts to one another. There is only one joining plane between the disk surfaces, which are situated one against the other, of adjacent disks. As an alternative, the bars which extend out of the laminated core may also not be exposed in the region of the slot which is formed by bevels or steps. Considered radially, the clearances in the disks are consequently positioned somewhat within the slot of the disks, considered radially inward, but in such a way that the bars nevertheless lie in the region of the melting zone during welding. During joining, a melt, which is produced by means of a laser beam or electron beam, for example flows around the bar regions in the vicinity of a slot, and said bar regions are electrically conductively connected to the disks.

Even in the case of joining methods that take place at relatively high temperatures, in this case only local heating of the disks to be joined occurs, without the rest of the component, and in particular the laminated rotor core, being thermally affected. By virtue of their good electrical conductivity, the alloys which are used for short-circuiting rings usually also have sufficient thermal conductivity, as a result of which the thermal energy which is introduced during joining is quickly dissipated by heat spreading.

In a preferred refinement of the invention, the bar ends can be electrically conductively joined to the disk stack of a short-circuiting ring. Usually, simply joining the bar ends together in short-circuiting rings will lead to an electrical connection that is not sufficient. The desired electrically conductive connection can be implemented either by way of the material of the individual disks being incipiently melted locally for a short time and adjacent disks being connected to the material of the bar ends along the joining gap. Therefore, a particularly good electrical connection is established between the rotor bars and the short-circuiting ring. In an advantageous embodiment of the invention, the joining connections may be welded connections or soldered connections. Laser beam welding or electron beam welding is preferred for this. Welded or soldered connections of this kind are particularly suitable in particular for joining connections which run around the entire periphery. The weld bead produced as a result is produced in the interior of the slot which is present between the disks, and can if appropriate completely fill the slot as far as the disk end face.

In other words: in the radial direction, a freely accessible opening consequently extends between adjacent disks as far as the level of the rotor bars in order to be able to join the individual parts to one another both electrically and mechanically. In this way, sufficient electrical contact for current conduction for operating an asynchronous machine is established. The clearances which are made in each disk are matched in shape and size to the rotor bars, with the result that they can be positioned with little play.

The thickness of the insulation layer on the surface of a rotor bar can advantageously be between 0.05 and 0.25 mm. Said layer thickness is sufficient for the required dielectric strength for the preferred materials.

In an advantageous refinement of the invention, the surface portions of the bar ends, which extend out of the rotor laminated core, of the rotor bars may not have an electrical insulation layer. Insulation of those ends of the rotor bars which are to be welded is not required in order to achieve adequate stability of the rotor by a thermal joining process. In particular, the blank connection points between rotor bar and short-circuiting ring exhibit high electrical conductivity.

It is particularly advantageous when the entire outer surface area of a rotor bar is insulated. In an advantageous embodiment, only the radially outer and/or the radially inner surface area portions of a rotor bar may have an electrical insulation layer. The partial insulation serves particularly for saving costs of insulation material, however the coverage has to be of a sufficient size that, during operation of an asynchronous machine, the rotational forces do not lead to individual sections of the bar surface areas touching the laminated core.

The electrical insulation layer can advantageously consist of an adhesive tape with a thickness of 0.05 mm to 0.15 mm, preferably of an adhesive tape with a thickness of 0.06 mm. One type of fiber insulation materials are adhesive tapes. After cleaning of the surface, said adhesive tapes are laid onto said surface and applied to the surface by means of contact-pressing. In order to ensure a maximum adhesive strength, care must also be taken in this process to avoid air pockets. Adhesive bonding is particularly suitable for the surface areas of the rotor bar which are freely accessible from the outside. Since, usually, the stack transverse flows are caused by a maximum voltage in the single-digit voltage range, the thinnest band thickness of 0.06 mm is already sufficient in order to achieve the required dielectric strength. However, the maximum thickness is also dependent on the joining gap and the option of mounting the insulated rotor bars in the laminated core.

In an advantageous embodiment, the electrical insulation layer can consist of a polyimide adhesive tape. From amongst the range of insulating materials searched for the purpose of avoiding stack transverse flows comprising ceramics, mica, polyimide, mixed plastic compounds and fiber mixtures, a polyimide adhesive tape originating from the group of fiber mixtures has proven particularly suitable. This adhesive tape is, in particular, admixed with polyimide, as a result of which it is suitable both for high temperatures and also for electrical insulations up to over 1000 V. Tests have shown that polyimide adhesive tape can be successfully used in all rotor bar/laminated core pairs used here with different dimensions of the laminated core slots. However, the joining gap, that is to say the encircling gap between rotor bar and laminated core slot, is notable for a possible use of an insulating material. In the rotor bar which is coated with polyimide adhesive tape, a joining gap of approximately 0.1-0.2 mm is already sufficient and advantageous for mounting.

A coating which satisfies the electrical requirements has been subjected to a welding test. The thermal influence on the coating during joining is intended to be assessed by welding tests. In so doing, conclusions were able to be drawn about which temperatures a further coating withstands and the extent to which the polyimide tape can be exposed to high temperatures for a short time. The tests yielded the result that even the polyimide film fitted directly below the first short-circuiting ring disk remains undamaged during welding of the first slot of the short-circuiting ring stack. No detaching of the coating from the bar can be observed either. For this type of application, the welding is carried out with parameters which are usually used, in order to obtain a representation, which is necessary for series production, of the result. In a further welding trial, in which all disks of the disk stack are joined directly one after the other without a cooling-down phase, the temperature was recorded directly below the first, already welded short-circuiting ring disk. In this case, said temperature is at most 180° C. Detaching of the adhesive tape from the substrate surface or various further modifications cannot be found either at the adhesive tape strip laid closest to the weld seam or at another fitted adhesive tape strip.

Furthermore, the rotor bars can preferably exhibit torsion about a longitudinal axis which runs through the surface area center of gravity. Twisting tests show that, for example, the polyimide adhesive tape can also be applied before twisting of the bar in the case of machine production, without the insulating properties of said polyimide adhesive tape being adversely affected.

BRIEF DESCRIPTION OF THE DRAWINGS

Exemplary embodiments of the invention will be explained in more detail with reference to the schematic drawings, in which FIG. 1 schematically shows a side view of a squirrel cage rotor.

DETAILED DESCRIPTION

Parts which correspond to one another are provided with the same reference symbols throughout the figures.

Figure 1:
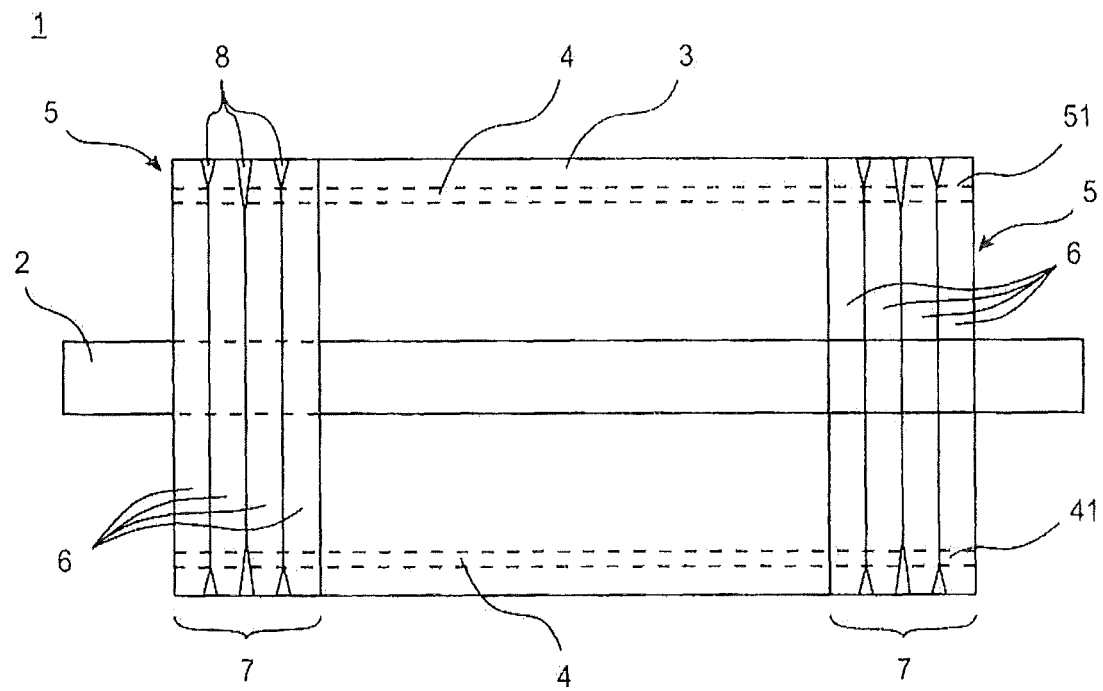

FIG. 1 schematically shows a side view of a squirrel cage rotor 1. In this state, the rotor laminated core 3 is positioned on the shaft 2, combined with two short-circuiting rings 5 with clearances 51 which terminate the rotor laminated core 3 at the end side. A plurality of rotor bars 4 are arranged in the interior of the laminated core 3 and the short-circuiting rings 5. The bar ends 41 of the rotor bars 4 protrude into clearances 51 of the short-circuiting rings 5 and terminate flush with the respectively outermost disk 6 of the disk stack 7. In this case, a disk stack 7 consists of four disks 6 which have joining gaps for cohesive connection of the short-circuiting rings 5. A joining connection 8, for example by welding or soldering, is realized in the joining gap.

Figure 2:
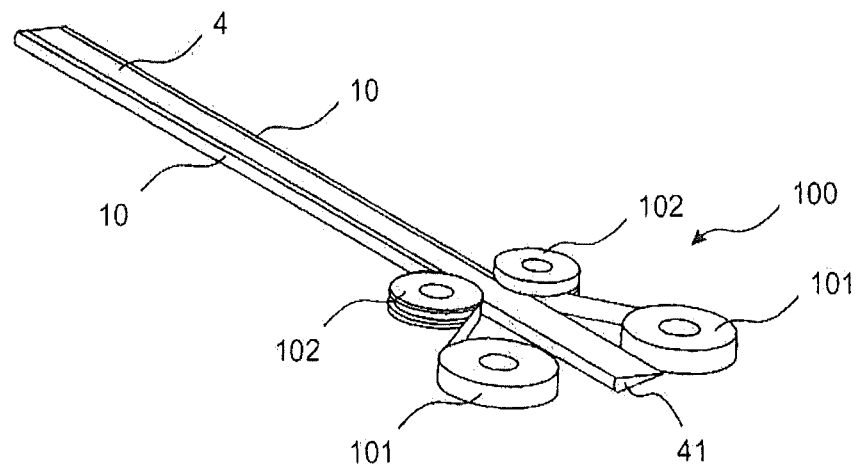
FIG. 2 shows a view of a rotor bar with an application apparatus.

FIG. 2 shows a view of a rotor bar 4 with an application apparatus 100 for an insulation layer 10. In this case, said application apparatus is an automatic application apparatus 100 for a polyimide adhesive tape reservoir which is located on adhesive tape rollers 101. Automatic unrolling of the adhesive tape from the adhesive tape rollers 101 takes place at a constant feed rate. The tensile force which is caused by the feeding of the adhesive tape which adheres to the semifinished product ensures the tape is autonomously pulled off from its respective adhesive tape roller 101 in the process. A possible way of matching the adhesive tape as insulation layer 10 to the shape of the rotor bar 4, without air pockets or similar faults which have a negative effect on the adhesive strength occurring here, has also been found.

Rotated pressure-application rollers 102 which are matched to the profile of the rotor bar 4 serve in order to guide the adhesive tape onto the rotor bar without faults. To this end, the radii and special shapes of a rotor bar 4 have been made as negative profiles in contact-pressure rollers 102 composed of plastic. In this case, the rollers are mounted such that they are driven by the feeding of the tape. Therefore, the coating is applied with as little material consumption as possible by the previously supplied adhesive tape. However, in order to stick the tape to the bar, pneumatic grippers can also be used for series production. A gripper of this kind given comprehensive insulation coating is outstandingly suitable particularly for the straight side faces of the rotor bar.

The adhesive tape can therefore be applied along a section of the rotor bar without the formation of bubbles. In this case, it is advantageous to optimize the coating with adhesive tape in respect of material used by way of only the radii of the rotor bar having adhesive applied. Here, the contact resistance is sufficiently high both when the rotor is vertical and when the rotor is horizontal.

Figure 3:
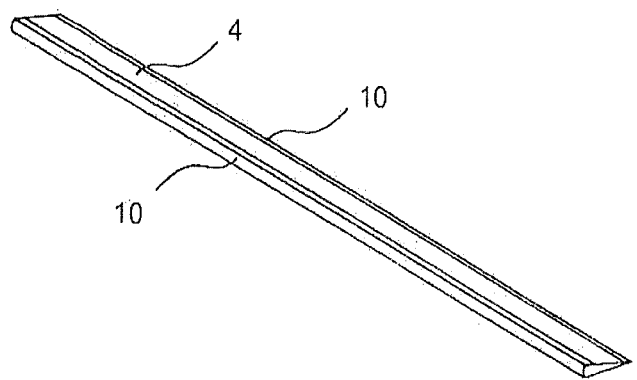
FIG. 3 shows an oblique view of a ready-to-install rotor bar with a partially applied insulation layer.

FIG. 3 shows an oblique view of a ready-to-install rotor bar 4 with a partially applied insulation layer 10 over the entire length. This variant consists in coating the entire rotor bar 4 with the adhesive tape only at the curved surface regions.

Figure 4:
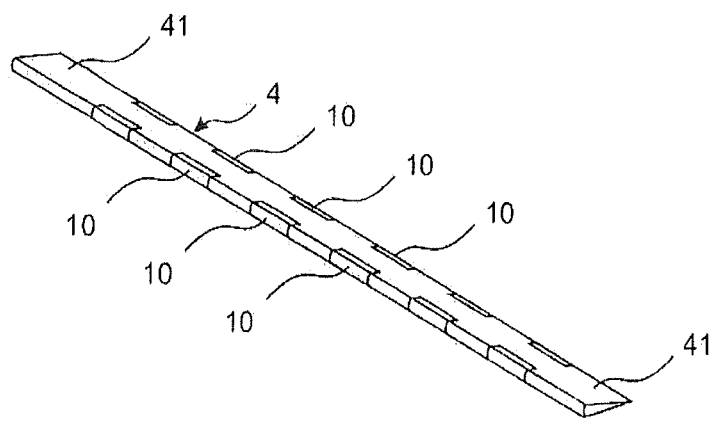
FIG. 4 shows an oblique view of a rotor bar with a partial insulation layer which is interrupted in the longitudinal axis.

FIG. 4 shows an oblique view of a rotor bar with a partial insulation layer 10 which is interrupted in the longitudinal axis. For the purpose of partial coating of the rotor bar, the adhesive tape is applied as insulation layer 10 only in sections, depending on the length to be coated of the rotor bar 4. The uncoated regions serve, in particular in the region of the bar ends 41, for the subsequent welding process and do not have to be treated further.

Figure 5:
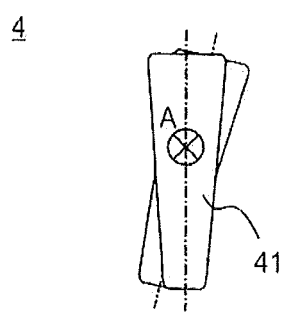
FIG. 5 shows a front view of a twisted rotor bar.

FIG. 5 shows a front view of a twisted rotor bar 4. Stack transverse currents can occur, in particular, on squirrel cage rotors which are produced in a slanted manner. This slanted arrangement is achieved by way of the entire laminated core being twisted about its rotation axis. On account of this process, the slots of the laminated core are also twisted, this in turn leading to a rotor bar also being likewise twisted. The view illustrated in FIG. 5 of a rotor bar 4 intended for a slanted squirrel cage rotor clearly shows torsion about the longitudinal axis A which runs through the surface area center of gravity. Knowledge about the behavior of the coating in the event of twisting of the bar is important specifically in respect of series production. Said information is used to make a decision as to whether the coating can be applied before twisting or whether this process has to take place after said twisting. A polyimide adhesive tape coating can also be applied after torsion of the rotor bar of far beyond 10°, as is often customary in the case of the production of turned rotors, without faults, air pockets or cracks. Further checking of the contact resistance also shows that the adhesive tape continues to satisfy its insulation properties.

Preferred process sequences, from amongst which coating of the rotor bar is advantageous, are:
1. after cleaning/before stamping
2. after stamping/before twisting
3. after twisting.

The particularly preferred time at which a coating process is integrated into the production operation is between cleaning and stamping to the desired length.

The invention claimed is:

1. A squirrel cage rotor for an asynchronous machine, the squirrel cage rotor comprising:
   a shaft;
   a rotor laminated core having an interior;
   rotor bars arranged in the interior of the rotor laminated core, each rotor bar having a pair of bar ends; and
   short-circuiting rings with clearances through which the bar ends of the respective rotor bars extend out of the interior of the rotor laminated core;
      wherein the rotor bars each have an outer surface area including a radially outer surface area portion and a radially inner surface area portion, and the radially outer surface area portions or the radially inner surface area portions, or both of the radially outer surface area portions and the radially inner surface area portions, of the rotor bars have an electrical insulation layer disposed thereon and cohesively connected thereto such that part of the outer surface area of each of the rotor bars disposed within the interior of the rotor laminated core and radially between the radially outer surface area portion and the radially inner surface area portion of each of the rotor bars is free of the electrical insulating layer, the electrical insulating layer being disposed to prevent contact between the rotor bars and the rotor laminated core as a result of rotational forces occurring during operation of the asynchronous machine.

2. The squirrel cage rotor according to claim 1, wherein at least one part of each of the short-circuiting rings comprises a disk stack constructed in a layered manner from individual disks having clearances.

3. The squirrel cage rotor according to claim 2, wherein the bar ends of the respective rotor bars are electrically conductively joined to the disk stacks of each of the short-circuiting rings.

4. The squirrel cage rotor according to claim 1, wherein a thickness of the electrical insulation layer is between 0.05 mm and 0.25 mm.

5. The squirrel cage rotor according to claim 1, wherein surface portions of the bar ends extending out of the rotor laminated core do not have an electrical insulation layer.

6. The squirrel cage rotor according to claim 1, wherein the electrical insulation layer comprises an adhesive tape with a thickness of 0.05 mm to 0.15 mm.

7. The squirrel cage rotor according to claim 1, wherein the electrical insulation layer comprises a polyimide adhesive tape.

8. The squirrel cage rotor according to claim 1, wherein each of the rotor bars includes laterally-spaced side surface area portions disposed radially between the radially outer surface area portion and the radially inner surface area portion of the respective rotor bar, and the part of the outer surface area of each of the rotor bars which is free of the electrical insulating layer is disposed on at least one of the side surface area portions radially between the radially outer surface area portion and the radially inner surface area portion of the respective rotor bar.

9. The squirrel cage rotor according to claim 1, wherein each of the rotor bars includes a pair of side surface area portions extending radially between the radially outer surface area portion and the radially inner surface area portion of the respective rotor bar, and the part of the outer surface area of each of the rotor bars which is free of the electrical insulating layer is disposed on the side surface area portions.

10. The squirrel cage rotor according to claim 1, wherein the outer surface area of each rotor bar has a radially outermost surface area portion, a radially innermost surface area portion and a pair of side surface area portions extending between the radially outermost surface area portion and the radially innermost surface area portion of the respective rotor bar, the radially outer surface area portion of each rotor bar including the radially outermost surface area portion and a part of each of the side surface area portions disposed adjacent the respective radially outermost surface area portion, the radially inner surface area portion of each rotor bar including the radially innermost surface area portion and a part of each of the side surface area portions disposed adjacent the respective radially innermost surface area portion, and the part of the outer surface area of each of the rotor bars which is free of the electrical insulating layer is disposed on each of the side surface area portions.

11. A squirrel cage rotor for an asynchronous machine, said squirrel cage rotor comprising:

an elongated shaft defining a longitudinal axis;
a laminated rotor core disposed on and extending axially along said shaft;
a pair of short-circuiting rings disposed at respective opposite axial sides of said rotor core;
a plurality of rotor bars extending through an interior of said rotor core and through said short-circuiting rings, each said rotor bar having spaced-apart opposite ends which extend outwardly through the respective short-circuiting rings, each said rotor bar having an outer surface area having a radially outer surface area portion and a radially inner surface area portion; and
an electrically-insulating layer disposed on at least one of said radially outer surface area portion or said radially inner surface area portion, and part of said outer surface area of each of said rotor bars disposed between said radially outer surface area portion and said radially inner surface area portion and within said interior of said rotor core is free of said electrically-insulating layer.

12. The squirrel cage rotor according to claim 11, wherein said outer surface area of each said rotor bar has a pair of side surface area portions extending between the respective radially outer and inner surface area portions thereof, and said electrically-insulating layer is disposed on part of at least one of said side surface area portions of each said rotor bar disposed immediately adjacent the at least one radially outer surface area portion or radially inner surface area portion.

13. The squirrel cage rotor according to claim 11, wherein said outer surface area of each said rotor bar has a pair of side surface area portions disposed between the respective radially outer and inner surface area portions thereof, and said part of said outer surface area of each of said rotor bars is disposed on one of said side surface area portions of the respective rotor bar.

* * * * *